(12) United States Patent
Panton (10) Patent No.: US 10,084,763 B2
(45) Date of Patent: Sep. 25, 2018

(54) METHODS AND SYSTEMS FOR ESTABLISHING SECURE COMMUNICATION BETWEEN DEVICES VIA AT LEAST ONE INTERMEDIATE DEVICE

(71) Applicant: pi.pe GmbH, Berlin OT (DE)

(72) Inventor: Timothy Howard Panton, Helsby (GB)

(73) Assignee: pi.pe GmbH, Berlin (DE)

( * ) Notice: Subject to any disclaimer, the term of this patent is extended or adjusted under 35 U.S.C. 154(b) by 222 days.

(21) Appl. No.: 14/837,174

(22) Filed: Aug. 27, 2015

(65) Prior Publication Data

US 2016/0072778 A1 Mar. 10, 2016

(30) Foreign Application Priority Data

Sep. 4, 2014 (GB) .................................. 1415675.6

(51) Int. Cl.
| | |
|---|---|
| H04L 29/06 | (2006.01) |
| H04W 76/14 | (2018.01) |
| H04W 76/02 | (2009.01) |
| H04W 88/02 | (2009.01) |

(52) U.S. Cl.
CPC ........ *H04L 63/061* (2013.01); *H04L 63/0876* (2013.01); *H04L 63/123* (2013.01); *H04L 63/126* (2013.01); *H04L 63/18* (2013.01); *H04W 76/023* (2013.01); *H04W 76/14* (2018.02); *H04W 88/02* (2013.01)

(58) Field of Classification Search
CPC ..... G06F 21/33; H04L 9/3247; H04L 9/3263; H04L 63/061; H04L 63/08;
(Continued)

(56) References Cited

U.S. PATENT DOCUMENTS

| | | |
|---|---|---|
| 7,103,774 B2 | 9/2006 | Wildish et al. |
| 8,473,744 B2 | 6/2013 | Shelest et al. |

(Continued)

OTHER PUBLICATIONS

McGrew et al. [RFC 5764] "Datagram Transport Layer Security (DTLS) Extension to Establish Keys for the Secure Real-time Transport Protocol (SRTP)". Internet Engineering Task Force, ISSN: 2070-1721, published: May 2010.*

(Continued)

*Primary Examiner* — Kevin Bechtel
(74) *Attorney, Agent, or Firm* — Hogan Lovells US LLP (57) ABSTRACT

Methods to establish communication between a first and second device via at least one intermediate device comprise, at the first device, generating an offer data packet comprising a second device address, which includes a first identifier indicating a public key associated with the second device; transmitting the offer data packet to a first intermediate device for transmission to the second device based upon the address of the second device; receiving an answer data packet via the first intermediate device, the answer data packet including network information associated with the second device; establishing a communication channel with the second device based on the network information received; receiving over the communication channel a first handshake data packet including a public key; calculating a second identifier based upon the public key; comparing the first identifier with the second identifier; and warning if a relationship between the first identifier and the second identifier is not an expected relationship.

19 Claims, 6 Drawing Sheets

(58) Field of Classification Search
CPC ............. H04L 63/0823; H04L 63/0876; H04L 63/12–63/126; H04L 63/18; H04W 12/06–12/12; H04W 76/023
See application file for complete search history.

(56) References Cited

U.S. PATENT DOCUMENTS

| | | |
|---|---|---|
| 2002/0152380 A1 | 10/2002 | O'Shea et al. |
| 2006/0020807 A1* | 1/2006 | Aura ................... H04L 9/3236 713/176 |
| 2007/0157026 A1 | 7/2007 | Zimmermann |
| 2015/0026473 A1* | 1/2015 | Johnston ............... H04L 63/126 713/171 |

OTHER PUBLICATIONS

Zimmermann et al. [RFC 6189] "ZRTP: Media Path Key Agreement for Unicast Secure RTP". Internet Engineering Task Force, ISSN: 2070-1721, published: Apr. 2011.*
European Search Report for Application No. 15182235.0, Jan. 28, 2016. (9 pages).
A. Johnston et al., Internet Engineering Task Force, Apr. 3, 2014. (12 pages).
J. Fischl et al., Internet Engineering Task Force, May 2010. (38 pages).
M. Handley Et al: "SDP: Session Description Protocol," RFC 4566, Jul. 31, 2006 (Jul. 31, 2006).

* cited by examiner

METHODS AND SYSTEMS FOR ESTABLISHING SECURE COMMUNICATION BETWEEN DEVICES VIA AT LEAST ONE INTERMEDIATE DEVICE

RELATED APPLICATIONS

This application claims priority to and the benefit of United Kingdom patent application GB1415675.6, filed Sep. 4, 2014, the contents of which are incorporated in entirety herein by reference.

BRIEF DESCRIPTION OF RELATED ART

Networks such as the public Internet, provide for fast and convenient communication options between devices and users. For example, email, Internet Relay Chat, Usenet, etc. each allow users to communicate with one or more others. Generally, however, convenient mechanisms for establishing communication channels over public networks have not provided privacy or authentication.

A wide variety of protocols for providing private, authenticated, communication, such as public key certificates, and protocols for establishing and exchanging asymmetric communication keys.

Recent communication technologies such as Web Real-Time Communication (WebRTC), allow for the establishment of browser-to-browser communication. As such, where users trust the devices on which their browsers operate, such users may have trust that such communication channels are relatively secure. In order to easily establish browser-to-browser communication channels, third party web applications that utilise what are known as "federated" identity management systems may be used as intermediaries for communication channel initialisation. "Delegated" identity management systems may be similarly used. In this way, a user of one web application may establish a communication with a user of another web application. Use of such third party applications, however, introduces intermediates which may not be trusted by the communicating parties.

SUMMARY

It is desirable, however, to provide methods and systems for more conveniently communicating securely among users. It is an object of embodiments of the present invention to obviate or mitigate at least one of the problems of prior art network communication methods.

According to a first aspect of the present invention, there is provided a method of establishing a communication channel between a first device and a second device via at least one intermediate device. The method comprises, at the first device: generating an offer data packet comprising an address of the second device, the address of the second device comprising a first identifier indicating a public key associated with the second device; transmitting the offer data packet to a first intermediate device for transmission to the second device based upon the address of the second device included in the offer data packet; receiving an answer data packet via the first intermediate device, the answer data packet comprising network information associated with the second device; establishing a communication channel with the second device based on the network information received in the answer data packet; receiving over the communication channel a first handshake data packet comprising a public key; calculating a second identifier based upon the public key within the first handshake data packet and comparing the first identifier with the second identifier; and providing a warning if a relationship between the first identifier and the second identifier is not an expected relationship.

By addressing the offer data packet to an address that includes an identifier of the second device, the first device is able to confirm that the identifier received in the handshake data packet is indeed associated with the second device. The first identifier may be a fingerprint of the public key associated with the second device; the second identifier may be a fingerprint of the public key within the first handshake data packet.

The answer data packet may comprise a third identifier indicative of a public key. The method may further comprise comparing the second identifier with the third identifier; and providing a warning if a relationship between the second identifier and the third identifier is not an expected relationship.

The first intermediate device may use a federated identity management system and the address of the second device may be an address within the federated identity management system. Alternatively, the first intermediate device may use a delegated identity management system, and the address of the second device may be an address within the delegated identity management system. The offer data packet may be created using a WebRTC API.

The method may further comprise, at the second device: receiving the offer data packet from a second intermediate device, the offer data packet comprising an address of the first device, the address of the first device comprising a fourth identifier indicating a public key of the first device; generating the answer data packet; transmitting the answer data packet to the second intermediate device for forwarding to the first device; establishing a communication channel with the first device based on network information contained within the offer data packet; receiving over the communication channel a second handshake data packet comprising a public key; calculating a fifth identifier based upon the public key within the second handshake data packet: comparing the fourth identifier with the fifth identifier; and providing a warning if a relationship between the fourth identifier and the fifth identifier is not an expected relationship.

The offer data packet may comprise a sixth identifier indicative of a public key. The method may further comprise: comparing the sixth identifier with the fifth identifier; and providing a warning if a relationship between the sixth identifier and the fifth identifier is not an expected relationship.

The second intermediate device may use the federated identity management system and the address of the first device may be an address within the federated identity management system. Alternatively, where the first device uses a delegated identity management system, the second device may use the delegated identity management system, and the address of the first device may be an address within the delegated identity management system. The answer data packet may be created using a WebRTC API.

The method may further comprise, at the first intermediate device: receiving the offer data packet from the first device; transmitting the offer data packet to a second intermediate device for onward transmission to the second device; receiving the answer data packet from the second intermediate device; and transmitting the answer data packet to the first device.

The method may further comprise, at the first intermediate device: requesting a session identifier from the first device; and receiving a first session identifier from the first device, the first session identifier indicating the public key of the first device.

The method may further comprise, at the first intermediate device: detecting the first session identifier in the offer data packet and determining the address of the first device based on the first session identifier; adding the address of the first device to the offer data packet; detecting the address of the first device in the answer data packet and determining the first session identifier based on the address of the first device; and adding the first session identifier to the answer data packet.

The method may further comprise, at the second intermediate device: transmitting the offer data packet to the second device; receiving the answer data packet from the second device; and transmitting the answer data packet to the first intermediate device.

The method may further comprise, at the second intermediate device: requesting a session identifier from the second device; receiving a second session identifier from the second device, the second session identifier indicating the public key of the second device.

The method may further comprise, at the second intermediate device: detecting the address of the second device in the offer data packet and determining the second session identifier from the address of the second device; adding the second session identifier to the second data packet; detecting the second session identifier in the answer data packet and determining the address of the second device based upon the second session identifier; and adding the address of the second device to the answer data packet. The method may further comprise exchanging data over the communication channel if the first identifier matches the second identifier.

According to a second aspect of the present invention, there is provided a method of securely transmitting audio/visual data between a first device and a second device, the method comprising: establishing a communication channel between the first device and the second device according to the first aspect; receiving a machine-readable input at a sensor of the first device; transmitting the machine-readable input through the communication channel to the second device; processing the machine-readable input at the second device. The machine readable input may be at least one of an optical code, an audio code or a signal.

According to a third aspect, there is provided an apparatus, comprising: a memory storing computer readable instructions configured to cause a computer to carry out a method according to the first or second aspect; and a processor configured to execute the computer readable instructions.

According to a fourth aspect, there is provided an apparatus for establishing a communication channel between a first device and a second device via at least one intermediate device, comprising: a memory storing computer readable instructions; a receiver; a transmitter; and a processor arranged execute the computer readable instructions to: generate an offer data packet comprising an address of the second device, the address of the second device comprising a first identifier indicating a public key associated with the second device; cause the transmitter to transmit the offer data packet to a first intermediate device for transmission to the second device based upon the address of the second device included in the offer data packet; cause the receiver to receive an answer data packet via the first intermediate device, the answer data packet comprising network information associated with the second device; establish a communication channel with the second device based on the network information received in the answer data packet; cause the receiver to receive over the communication channel a first handshake data packet comprising a public key; calculate a second identifier based upon the public key within the first handshake data packet and comparing the first identifier with the second identifier; and provide a warning if a relationship between the first identifier and the second identifier is not an expected relationship.

It will be appreciated that features described above or below in relation one aspect or embodiment may be combined with features described in relation to another aspect or embodiment.

BRIEF DESCRIPTION OF THE DRAWINGS

Embodiments of the present invention are now described, by way of example only, with reference to the accompanying drawings, in which.

DETAILED DESCRIPTION

Figure 1:
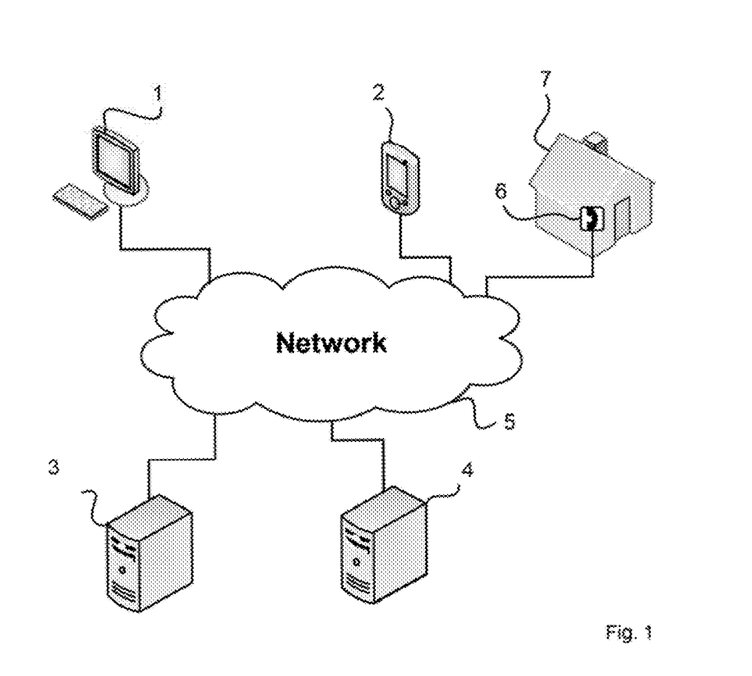
FIG. 1 is a schematic representation of a network of devices that may be used to implement embodiments of the present invention.

In FIG. 1 there is illustrated a network of computer devices that can be used to implement embodiments of the present invention. First and second user devices 1, 2 and first and second servers 3, 4 each connect to a network 5, for example the Internet.

The servers 3, 4 are each adapted to provide applications to client computers over a network. Each of the servers 3, 4 provide functionality to client computers to allow client-to-client communication and media exchange. For example, the servers 3, 4 may each provide functionality to allow clients to initiate voice and/or video calls to other clients. Each of the servers 3, 4 provide compatible applications such that a client of the server 3 can initiate communication with a client of the server 4, and vice versa. For example, the servers 3, 4 may each utilise a federated identity management system. By way of example only, each of the servers 3, 4 may utilise SIP or XMPP/Jingle based instant messaging signalling protocols.

It will be appreciated that the network 5 may be any suitable public or private network and may be, for example, the Internet. The connections between the user devices 1, 2, servers 3, 4 and the network 5 may take any appropriate form and may be wired or wireless connections. While illustrated as a desktop computer, and a mobile telephone in FIG. 1, the user devices 1, 2 may take any appropriate form. It will further be appreciated that while two user devices 1, 2 are illustrated, this is merely for the purpose of clarity and any number of user devices may be used with embodiments of the present invention.

In the present description, it is assumed that the web servers 3, 4 and the user devices 1, 2 are arranged to use the Web Real-Time Communication (WebRTC) API from the World Wide Web Consortium (W3C). That is, in the presently described embodiment, the servers 3, 4 provide WebRTC compatible applications over the network 5, while browser software operating on each of the user devices 1, 2 is configured to access the WebRTC applications provided by the servers 3, 4. WebRTC applications and their use will be known to the skilled person. It will be appreciated from the following description, however, that the present invention need not be limited to any particular application format, and is more generally applicable. Indeed, as will become apparent, the present invention is usable with any communication applications that utilise cryptographic handshakes between communicating users, in which public keys (such as those included within public key certificates) are exchanged in a fingerprint-verified exchange between those users.

Figure 2:
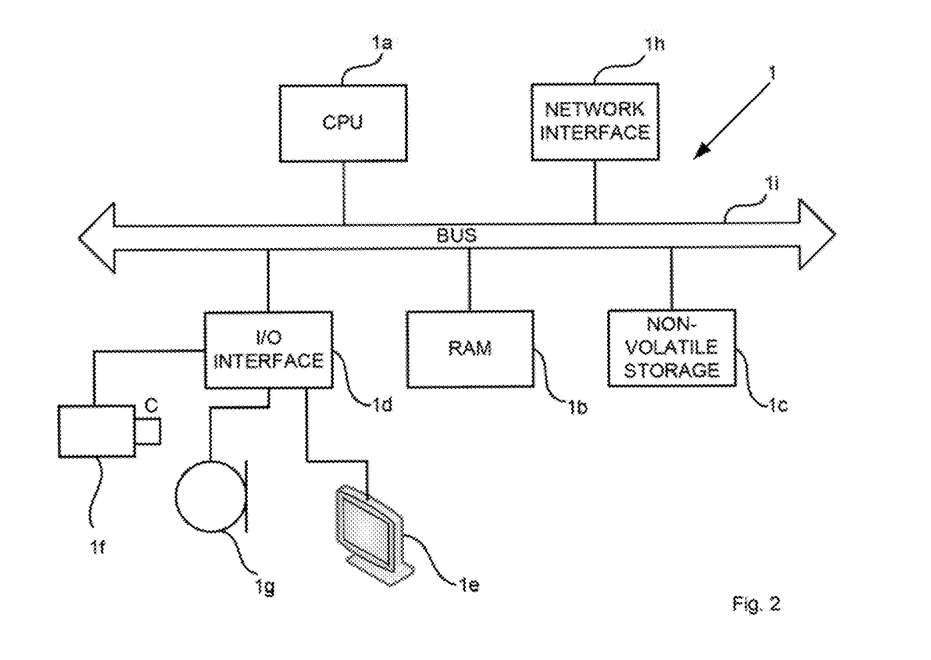
FIG. 2 is a schematic representation of a device of FIG. 1.

Referring to FIG. 2 there is shown an exemplary schematic illustration of components which can be used to provide the user device 1 in accordance with some embodiments of the present invention. It can be seen that the user device 1 comprises a CPU 1*a* which is configured to read and execute instructions stored in a random access memory 1*b*, which may take the form of a volatile memory. The RAM 1*b* stores instructions for execution by the CPU 1*a* and data used by those instructions. For example, the instructions used to provide a WebRTC compatible web browser application may be loaded into and stored in the volatile memory 1*b*.

The user device 1 further comprises non-volatile storage 1*c*, which may take the form of a solid state drive, though it will be appreciated that any other form of non-volatile storage may be used. Computer readable instructions for causing the user device 1 to provide browser applications may be stored in the non-volatile storage 1*c*. The user device 1 further comprises an I/O interface 1*d* to which are connected peripheral devices used in connection with the user device 1. More particularly, a display 1*e* is configured so as to display output from the user device 1. The display may additionally be arranged to receive input. Input devices are also connected to the I/O interface 1*d*. Such input devices include a camera 1*f* and a microphone 1*g* which allow user interaction with the user device 1. A network interface 1*h* allows the user device 1 to be connected to appropriate computer networks, such as the network 5, so as to receive and transmit data from and to other computing devices such as the servers 3, 4 and the user device 2. The CPU 1*a*, volatile memory 1*b*, non-volatile storage 203, I/O interface 1*d*, and network interface 1*h*, are connected together by a bus 1*i*.

The user device 2 may be similarly arranged. It will be appreciated that the arrangement of components illustrated in FIG. 2 is merely exemplary, and that the user devices 1, 2 may comprise additional or fewer components than those illustrated in FIG. 2.

The servers 3, 4 may also be arranged similarly to the arrangement illustrated in FIG. 2. Indeed, the servers 3, 4 may comprise a plurality of computers, similar to, or arranged differently from, the arrangement of FIG. 2. For example, the servers 3, 4 may each comprise a plurality of computers respectively adapted to provide, inter alia, a web server, an application server, a gateway server and a database server etc., to provide applications to the user devices 1, 2 over the network 5. That is, it is to be understood that the servers 3, 4 may be implemented using any appropriate configuration as will be readily appreciated by those skilled in the art.

As described above, applications provided by the servers 3, 4 to the user devices 1, 2 allow for communication between the user devices 1, 2. The servers 3, 4 may be considered to be first and second intermediate devices respectively.

Figure 3A:
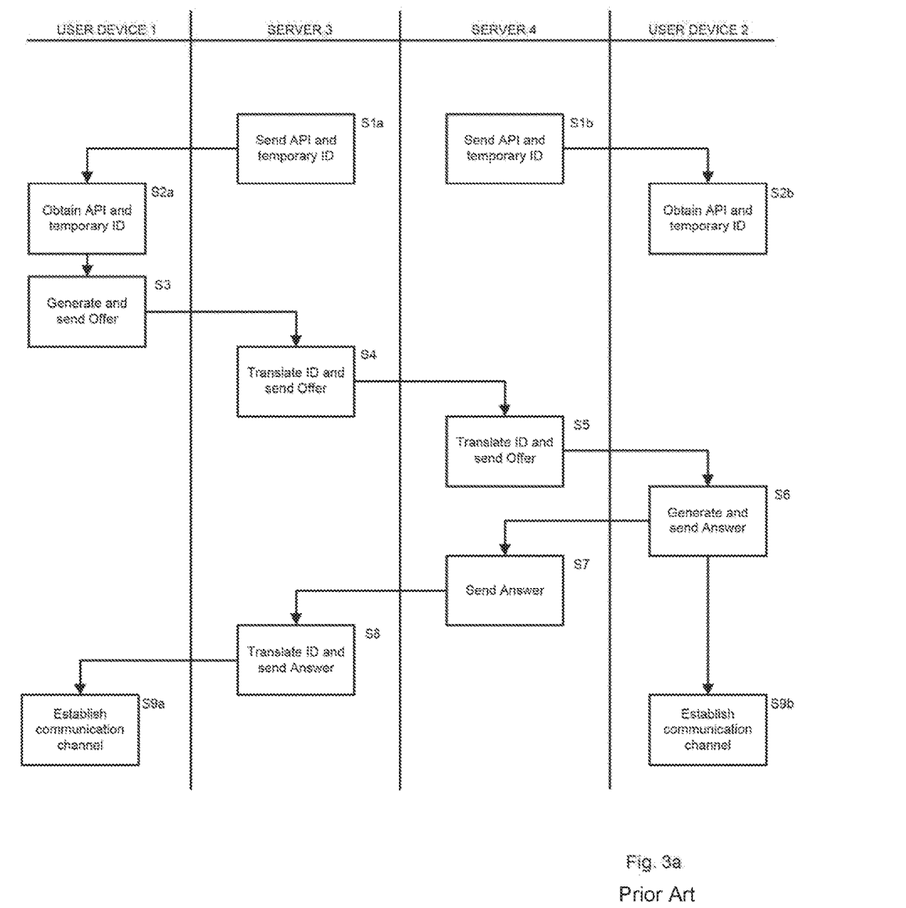
FIG. 3a is a flowchart illustrating processing that may be carried out to establish a communication channel according to a prior art method.
Figure 3B:
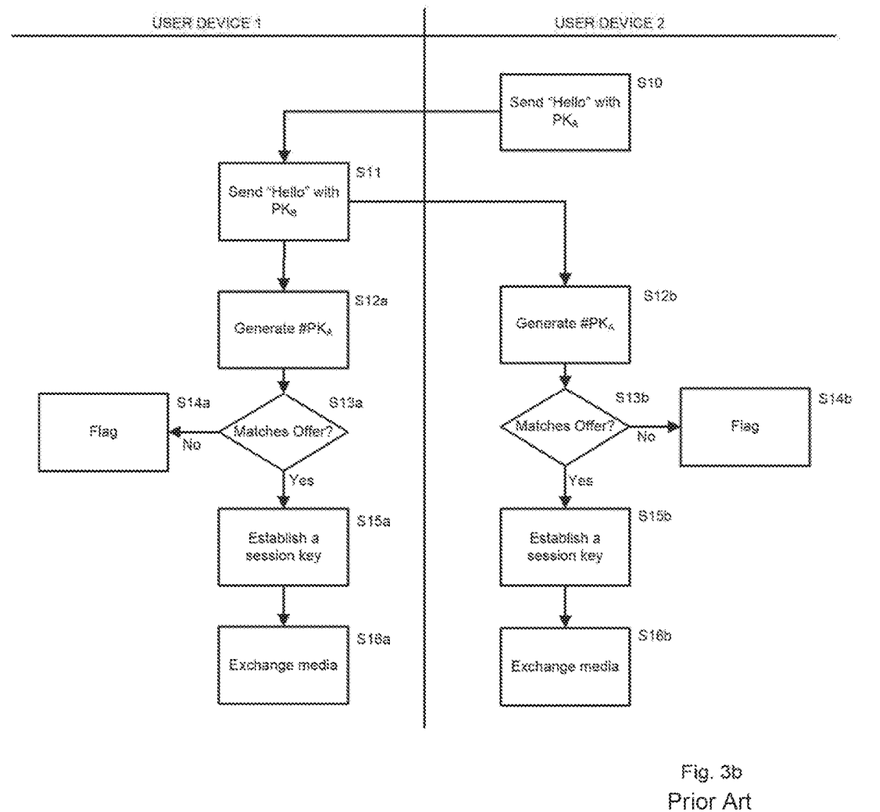
FIG. 3b is a flowchart illustrating processing that may be carried out to establish a cryptographic key for further communication over the communication channel established in the processing of FIG. 3a according to a prior art method.

FIG. 3 is a flowchart showing processing carried out in prior art methods by the user devices 1, 2 and the servers 3, 4 to establish a browser to browser communications session between the user device 1 and the user device 2. The processing of FIG. 3 commences upon a browser application of the user device 1 being directed to the application provided by the server 3 and a browser application of the user device 2 being directed to the application provided by the server 4. It will be understood in the following description that references to the servers 3, 4 include references to the applications provided by the servers 3, 4.

It will be appreciated that the users of the user devices 1, 2 may be required to log in to the respective applications. That is, the user of the user device 1 (referred to herein as user A) may identify themselves to the application provided by the server 3. Similarly, the user of the user device 2 (user B) may identify themselves to the application provided by the server 4. Suitable web application authentication protocols and methods will be known to the skilled person.

Referring to FIG. 3*a*, at step S1*a* the server 3 sends web page to the user device 1 containing a script (e.g. a Javascript script) that facilitates user to user calling. The script is stored at the user device 1 and executed in the browser. The script provides an API which the browser of the user device 1 can use to check for messages from the application provided by the server 3. In the present example, the script is a WebRTC script providing a WebRTC API to facilitate user to user calling. The server 3 also generates a temporary session ID that is associated with the user A for the current browsing session.

At step S2*a* the server 4 sends a web page to the user device 2 containing the same, or a similar script, that facilitates user to user calling. The script is stored at the user device 2 and executed within the browser. In the present example, the script uses the WebRTC API to facilitate user to user calling. The script provides an API which the browser of the user device 2 can use to check for messages from the application provided by the server 4. The server 4 generates a temporary ID that is associated with the user B for the current browsing session. The temporary IDs assigned to the user devices 1, 2 allow the servers 3, 4 to direct messages addressed to the "user A" or the "user B" to the correct device.

The user A decides to "call" the user B. That is, the user A wishes to initiate a device-to-device communication channel between the user A's user device (the user device 1) and a user device of the user B (the user device 2). For example, the user A may select an icon representing the user B through an interface provided by the application provided by the server 3. To initiate the call, processing passes from step S1*b* to step S3. At step S3, the user device 1 uses the webRTC API provided by the script received from the server 3, to create an 'offer' data packet. The offer comprises the temporary session ID of the user device 1 provided at step S1a, an indication that the call is to the user B (e.g. userB@server4.com), an indication of the capabilities (e.g. audio and video codecs usable by the user device 1, etc.) and network environment of the user device 1, and a cryptographic fingerprint (#$PK_A$) of a Public key ($PK_A$) that the user A/user device 1 will use during the call with the user B.

The indication of the network environment of the user device 1 contains information with which the user device 2 may attempt to establish a direct connection with the user device 1. For example, the offer may comprise a list of possible IP addresses and ports that may be reachable by a third party. A typical user device may have a plurality of addresses to which an attempt to establish a connection may be directed. For example, a local IPV4 address, a local IPV6 address, a Public (i.e. (on the user's ISP's network) IPV4 address and a Public IPV6 address. It will be appreciated that users may additionally have other addresses, such as VPN (Virtual Private Network) addresses or a mobile network address (e.g. UMTS, CDMA, etc.)

The offer is sent from the user device 1 to the server 3. The offer may, for example, utilise the Session Description Protocol (SDP) which will be known to those skilled in the art.

Processing passes from step S3 to step S4, at which the server 3 translates the temporary session ID into an address within the federated identity management system used by the application provided by the server 3. For example, at step S4, the server 3 may translate the temporary session ID of the user device 1 to userA@server3.com and indicate that the call is for userB@server4.com. It will be appreciated that while in the exemplary embodiment the server 4 adds the federated address of the user A to the offer data packet, this is merely exemplary. In other embodiments, the user device 1 may store, or determine/generate, the federated identity of the user A such that this can be included, by the user device 1, in the offer data packet. Where this is the case, it will be appreciated that the server 3 need not perform a mapping to determine the federated identity of the user A at step S4.

The offer is sent to the server 4 and processing passes to step S5. At step S5 the server 4 receives the offer and translates the destination address to the temporary session ID that was provided to the user device 2 at step S1b. The offer is sent from the server 4 to the user device 2 and processing passes to step S6.

At step S6 the user device 2 receives the offer and alerts the user B (for example by providing an audio and/or visual output on the user device 2). The user B accepts the call using an interface of the application provided by the server 4. In response to the acceptance of the call, the user device 2 generates an 'answer' data packet. The answer comprises an indication of any relevant capabilities of the user device 2 that are shared with the user device 1, the network environment of the user device 2 and a cryptographic fingerprint (#$PK_B$) of a Public key ($PK_B$) that the user B/user device 2 will use during communication with the user A/user device 1. The answer is transmitted from the user device 2 to the server 4, and processing passes to step S7.

At step S7 the server 4 receives the answer and sends this to the server 3 using the mapping between the federated ID and session identifier of the user device 2 established at step S5. At step S8 the server 3 receives the answer and forwards this to the user device 1 using the mapping between the federated ID and session identifier of the user device 1 established at step S4. Upon receiving the answer at step S9a, the user device 1 uses the network information contained in the answer to search for routes through the network 5 to the user device 2 by transmitting data packets to and listening for data packets from the user device 2. Similarly, having accepted the offer, at step S9b, the user device 2 uses the network information contain within the offer to search for routes through the network 5 by transmitting data packets to, and listening for data packets from, the user device 1. In the present example utilising WebRTC based applications, the messages transmitted by the user devices 1, 2 to establish viable routes are Internet Connectivity Establishment (ICE) protocol data packets.

The browsers of each of the user devices 1, 2 complete the connection establishment exchange upon finding one or more routes between the user devices 1, 2 and selecting one route to be used to exchange further communications (e.g. video and/or audio data) during the call. The processing of FIG. 3a therefore establishes a communication channel between the user device 1 and the user device 2. Prior art methods for mutual authentication, following the processing of FIG. 3a, is now described with reference to FIG. 3b.

At step S10 the user device 2 initiates a handshake with the user device 1 by transmitting a handshake data packet to the user device 1 via the communication channel established by way of the processing of FIG. 3a. The handshake data packet contains the public key $PK_B$. By way of example, in the presently described embodiment, the handshake data packet is a Datagram Transport Layer Security (DTLS) ClientHello data packet which includes the public key certificate of the user device 2. Processing passes from step S10 to step S11, at which, upon receiving the handshake data packet from the user device 2, the user device 1 transmits a response handshake data packet including the public key $PK_A$. In the presently described example embodiment, in response to receiving a ClientHello data packet including the public key certificate of the user device 1, the user device 1 transmits a ServerHello data packet.

Processing passes from step S11 to steps S12a and S12b. At step S12a, the user device 1 generates a fingerprint #$PK_B$ of the public key $PK_B$ using the same hash function (for example, SHA-256) used by the user device 2 to generate the fingerprint #$PK_B$ at step S6 of the processing of FIG. 3a. Similarly, at step S12b, the user device 2 generates a fingerprint #$PK_A$ of the public key $PK_A$ using the same hash function that was used by the user device 1 to generate the fingerprint #$PK_A$ at step S3 of the processing of FIG. 3a.

Processing at the user devices 1, 2 passes from steps S12a, S12b to steps S13a, S13b respectively. At step S13a, the user device 1 compares the fingerprint generated at step S12a with the fingerprint that was received in the answer from the user device 2 during the processing of FIG. 3a. If it is determined at step S13a that the fingerprint calculated at step S12a does not match that received in the answer, this may indicate that communication with the user B via the communication channel is being intercepted by a third party, and processing passes to step S14a at which an indication is provided to the user A via the user device 1. For example, at step S14a a warning may be displayed on the display of the user device 1.

That is, if the fingerprint calculated at step S12a does not match that received in the answer from the user device 2, this may indicate that a third party has intercepted the handshake data packet sent at step S10 and replaced the public of the user B with a public key of the third party so as to have access to an asymmetric 'session' key exchanged between the user devices 1, 2.

If, on the other hand, it is determined at step S13a that the fingerprint calculated at step S12a does match the fingerprint received in the answer from the user device 2, this indicates that the handshake data packet sent at step S10 has not been modified by a third party, and processing passes to step S15a at which the call is continued.

Processing at the user device 2 follows a similar course. In particular, at step S13b, the user device 2 compares the fingerprint generated at step S12b with the fingerprint that was received in the offer from the user device 1 during the processing of FIG. 3a. If it is determined at step S13b that the fingerprint generated at step S12b does not match that received in the offer, this may indicate that handshake data packet sent at step S11 was intercepted and modified by a third party (to include the public key of the third party), and processing passes to step S14b at which an indication is provided to the user B via the user device 2. For example, at step S15b a warning may be displayed on the display of the user device 2.

If, on the other hand, it is determined at step S13b that the fingerprint calculated at step S12b does match the fingerprint received in the offer from the user device 1, processing passes to step S15b at which the call is continued. At steps S15a, S15b the user devices 1, 2 exchange a session key (e.g. an asymmetric cryptographic key) for use in encrypting further communications over the communication channel. The session key may be established using the public keys of the user devices 1, 2 according to any number of methods as will be readily apparent to the skilled person. Following exchange of session keys at steps S15a, S15b, processing passes to step S16a at the user device 1 and S16b at the user device 2 at which media (e.g. audio and/or visual data) may be exchanged over the communication channel.

It will be appreciated that additional processing (not depicted in FIG. 3b) may be performed following steps S14a, S14b. For example, in the event that either of the fingerprints generated by the user devices 1, 2 at steps S12a, S12b do not match those received by that device during the connection establishment processing of FIG. 3a, the user of that device may be provided with options for terminating the call, continuing the call, or re-trying the connection establishment processing of FIG. 3a. Alternatively, upon detecting that the generated fingerprints do not match those received during the processing of FIG. 3a, a user device may immediately disengage the communication channel established during the processing of FIG. 3a.

The prior art processing of FIGS. 3a, 3b therefore provides one way in which two devices can establish an encrypted communication channel with some degree of verification that data packets are not being intercepted, read and/or modified, by a third party. It is possible, however, for a third party with sufficient access to the server 4 or the server 3, or to nodes within the network 5 between user devices 1, 2 and servers 3, 4, to intercept data packets sent to and from the user devices 1,2, servers 3, 4 during the connection establishment processing of FIG. 3a, allowing a third party to obtain the session key established during the processing of FIG. 3b and decrypt data packets sent during the call. For example, if, during the processing of FIG. 3a, a third party intercepts the offer transmitted from the user device 1 to the user device 2 (via the servers 3, 4), that third party may replace the fingerprint #$PK_A$ with a fingerprint of a public key belonging to the third party. The processing of FIG. 3b would then proceed, with the third party replacing the public key $PK_A$ with its own public key at step S11 such that the identity verification tests of steps S13a, S13b are passed.

Figure 4A:
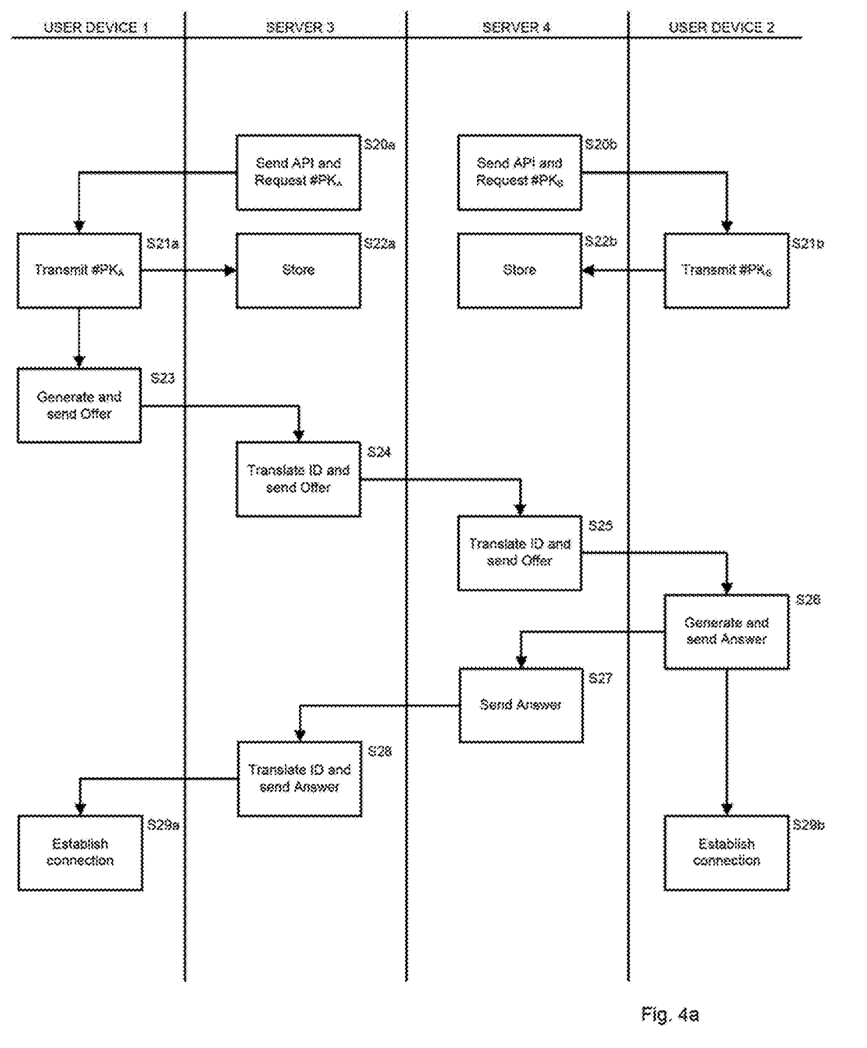
FIG. 4a is a flowchart illustrating processing that may be carried out to establish a communication channel according to an embodiment of the present invention.

FIG. 4a is a flowchart showing processing carried out to establish a connection between the user device 1 and the user device 2 according to an embodiment of the invention. As with the description of FIGS. 3a, 3b above, it will be appreciated that the users of the user devices 1, 2 may be required to log in to the respective applications provided by the servers 3, 4. That is, the user of the user device 1 (user A) may identify themselves to the application provided by the server 3, while the user B may identify themselves to the application provided by the server 4. As is described in more detail below, in the method of FIG. 4b, the federated addresses of the users A, B used to establish device-to-device connections through the applications provided by the servers 3, 4 are based upon identifiers that indicate a public key of that user.

At step S20a, the server 3 sends web page to the user device 1 containing a script (e.g. a Javascript script) that facilitates user to user calling. The script is stored at the user device 1 and executed in the browser of the user device 1. In the present example, the script uses the WebRTC API to facilitate user to user calling. The script provides an API which the browser of the user device 1 can use to check for messages from the application provided by the server 3. The server 3 also requests an identifier indicative of a public key $PK_A$ of the user device 1.

Processing passes from step S20a to step S21a at which the user device 1 transmits an identifier indicative of the public key $PK_A$ to the server 3. In the present example, the identifier is a fingerprint #$PK_A$ of the public key $PK_A$. As described above, the fingerprint may be calculated in any convenient way, and where the WebRTC definition is used, may be calculated using the SHA-256 hashing function. Processing passes from step S21a to step S22a at which the identifier is stored at the server 3 and associated with the user A and the user device 1 as a session identifier for the current browsing session. That is, rather than provide a randomly generated temporary session identifier as in step S1a, the identifier representing the public key of the user device 1 is used by the server 3 to identify the user device 1.

Similarly, at step S20b, the server 4 sends web page to the user device 2 containing the same, or a similar script, that facilitates user to user calling. The script is stored at the user device 2 and executed within the browser. In the present example, the script uses the WebRTC API to facilitate user to user calling. The script provides an API which the browser of the user device 2 can use to check for messages from the application provided by the server 4. The server 4 also requests an identifier indicative of a public key $PK_B$ of the user device 2.

At step S21a the user device 2 transmits an identifier indicative of the public key $PK_B$ to the server 4, which, in the present example, is a fingerprint #$PK_B$ of the public key $PK_B$. The fingerprint #$PK_B$ may be calculated, for example, using the SHA-256 hashing function. At step S22b, the identifier #$PK_B$ is stored at the server 4 and associated with the user B and the user device 2 as a session identifier for future communication between the user device 2 and the server 3. In other embodiments, a session key may be established in other ways. For example, a session key may be established as described above with reference to FIG. 3a.

As described above, the applications provided by the servers 3, 4 use compatible software and implement a federated identity management system such that users of each application can establish device-to-device "calls". In the present embodiment, the federated identity of each user is based upon an identifier that indicates that user's public key. In particular, in the present embodiment, each user's federated identity comprises the fingerprint #$PK_A$, #$PK_B$, of their respective public keys $PK_A$, $PK_B$.

The user A decides to call the user B. For example, the user A may select an icon representing the user B through an interface provided by the application provided by the server 3. To initiate the call, processing passes from step S21a to step S23. At step S23, the user device 1 generates an 'offer' data packet that represents the capabilities and network environment of the user device 1, and includes the session identifier #$PK_A$. The user device 1 sends this request to the server 3. In the present example, the user device 1 may use the webRTC API provided by the script received from the server 3, to create and send an appropriate offer.

At step S24, the server 3 uses the session identifier #$PK_A$ to identify the address of the user A in the name space used by the federated identity management system, itself based on the identifier indicating the public key $PK_A$. For example, the server 3 may translate the session identifier of the user device 1 to an address such as {#$PK_A$}@server3.com. Similarly, the call may addressed to {#$PK_B$}@server4.com.

The offer is sent by the server 3 to the server 4, and processing passes to step S25. At step S25, the server 4 uses the federated name {#$PK_{B}$}$_{@server}$4.com to identify the internal session identifier associated with the user device 2 (i.e. #$PK_B$) and forwards the offer to the user device 2. Processing passes from step S25 to step S26 at which the user device 2 receives the offer and alerts the user B. The user B accepts the call using an interface of the application provided by the server 4. In response to the acceptance of the call, the user device 2 generates an "answer" data packet. The answer comprises an indication of any relevant capabilities of the user device 2 that are shared with the user device 1, the network environment of the user device 2 and a cryptographic fingerprint (#$PK_B$) of the public key ($PK_B$) that the user device 2 will use during communication with the user device 1.

The answer is transmitted from the user device 2 to the server 4 as part of the session established at steps S20b-S22b, with an indication that it is for the user A (i.e. {#$PK_A$} @server3.com) and processing passes to step S27. At step S27 the server 4 receives the answer and forwards this to the server 3.

At step S28 the server 3 receives the answer, translates the federated address {#$PK_A$l@server3.com into the internal session identifier associated with the user A (i.e. #$PK_A$} and forwards this to the user device 1. Upon receiving the answer at step S29a, the user device 1 uses the network information contained in the answer to search for routes through the network 5 to the user device 2. In particular, at step S29a, the user device 1 begins transmitting data packets to, and listening for data packets from, the user device 2. Similarly, having accepted the offer, at step S29b, the user device 2 uses the network information contain within the offer to search for routes through the network 5 by transmitting data packets to, and listening for data packets from, the user device 1. In the present example utilising WebRTC based applications, the messages are Internet Connectivity Establishment (ICE) protocol data packets.

The user devices 1, 2 complete the connection establishment upon finding one or more routes between the user devices 1, 2 and selecting one of those routes for the further exchange of data during the call. Like the processing of FIG. 3a, the processing of FIG. 4a therefore establishes a device-to-device communication channel between the user device 1 and the user device 2.

Figure 4B:
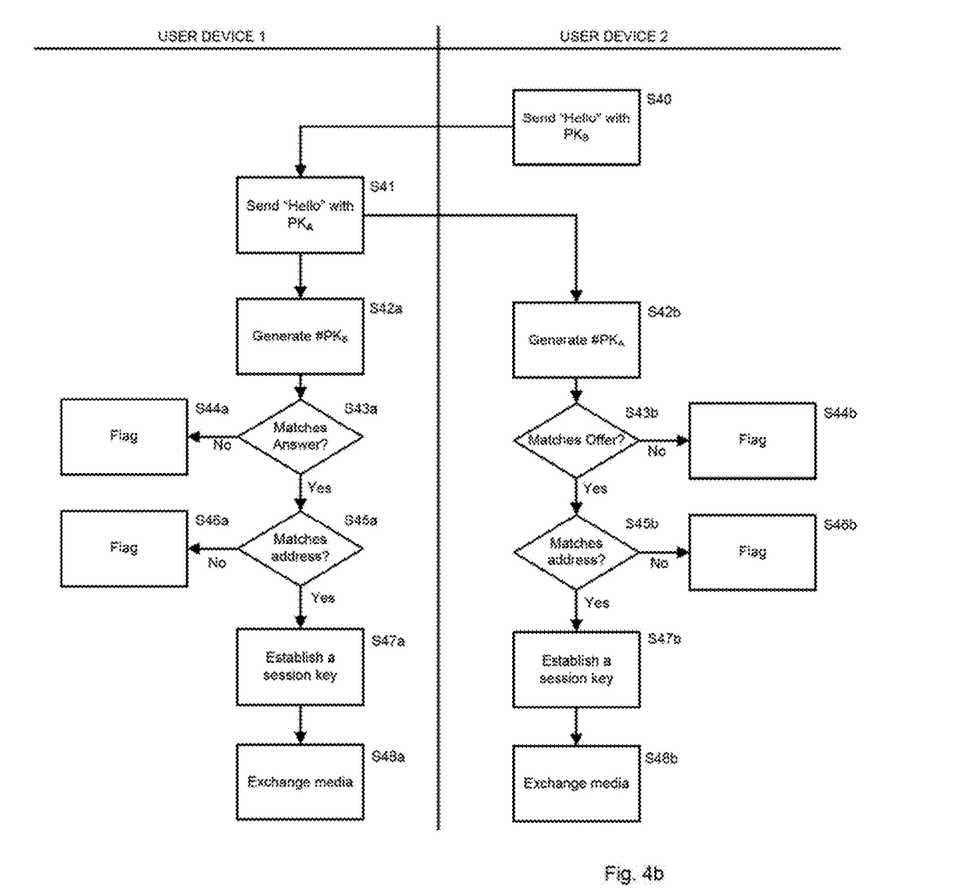
FIG. 4b is a flowchart illustrating processing that may be carried out to establish a cryptographic key for communication over the communication channel established in the processing of FIG. 4a according to an embodiment of the present invention.

Processing to authenticate the user devices 1, 2 to each other and to establish a cryptographic session key, according to an example embodiment of the invention is now described.

At step S40 the user device 2 initiates a handshake with the user device 1 by transmitting a handshake data packet to the user device 1 via the communication channel established during the processing of FIG. 4a. The handshake data packet contains the public key $PK_B$ of the user device 2. By way of example, in the presently described embodiment, the handshake data packet is a Datagram Transport Layer Security (DTLS) ClientHello data packet comprising the public key certificate (for example an X.509 standard certificate) of the user device 2. Processing passes from step S40 to step S41, at which, upon receiving the handshake data packet from the user device 2, the user device 1 transmits a response handshake data packet including the public key $PK_A$ of the user device 1. In the presently described example embodiment, in response to receiving a ClientHello data packet, the user device 1 transmits a ServerHello data packet comprising the public key certificate (for example an X.509 standard certificate) of the user device 1. It will be appreciated that while in the presently described example, the user device 2 initiates the handshake (i.e. transmits a temporally first handshake data packet), in other example embodiments, the user device 1 may initiate the handshake, or both devices may transmit handshake data packets without first receiving a handshake data packet from the other user device.

Processing passes from step S41 to steps S42a at the user device 1 and S42b at the user device 2. At step S42a, the user device 1 generates an identifier based on the public key received in the handshake data packet. In the present example embodiment, the user device 1 generates a fingerprint of the public key received in the handshake packet using the same hash function used by the user device 2 to generate the fingerprint #$PK_B$ transmitted in the answer at step S26 of FIG. 4a Similarly, at step S42b, the user device 2 generates an identifier based on the public key that it received in the handshake data packet. For example, the user device 2 calculates the fingerprint #$PK_A$ of the public key $PK_A$ using the same hash function that was used by the user device 1 to generate the fingerprint #$PK_A$ at step S23 of the processing of FIG. 4a.

Processing at the user devices 1, 2 passes from steps S42a, S42b to steps S43a, S43b respectively. At step S43a, the user device 1 compares the identifier generated at step S42a with the identifier that was received in the answer generated by the user device 2 at step S26 of the processing of FIG. 4a. If it is determined at step S43a that the identifier calculated at step S42a does not match the identifier received in the answer, this may indicate that communication with the user B is being intercepted and modified by a third party, and processing therefore passes to step S44a, at which an indication is provided to the user A, via the user device 1. For example, at step S44a a visual or auditory warning may be displayed, or emitted, on the display or from a speaker, of the user device 1.

If, on the other hand, it is determined at step S43a that the identifier calculated at step S42a does match the identifier received in the answer from the user device 2, processing passes to step S45a. As described above, while passing the test at step S43a indicates that the device with whom the user device 1 is currently communicating has the same public key as the device from whom the user device 1 received the answer during the processing of FIG. 4a, this indicates that a third party has not begun intercepting and tampering with data packets after the processing of FIG. 4a.

The processing at step S43a does not indicate whether a third party intercepted and tampered with data packets sent during the processing of FIG. 4a.

As such, at step S45a, it is determined whether the identifier calculated at step S42a matches the identifier contained within the address to which the offer generated at step S23 was initially directed (that is, the address of the user B/user device 2). If it is determined that the calculated identifier does not match the identifier contained within the address to which the offer was initially directed, this may indicate the presence of third party interception and tampering of the data packets, and as such, processing passes to step S46a. At step S46a an indication that the identifier calculated at step S42a does not match the identifier within the address to which the call was directed is provided to the user A via the user device 1.

If, on the other hand, it is determined at step S45a that the identifier calculated at step S42a does match the identifier within the address to which the call was initially directed, this indicates an absence of third party interception and tampering of data packets sent via the communication channel, and processing passes to step S47a.

Similarly, at step S43b, the user device 2 compares the identifier generated at step S42b with the identifier that was received in the offer from the user device 1 during the processing of FIG. 4a. If it is determined at step S43b that the calculated identifier does not match that received in the offer, this may indicate third party interception and tampering of data sent via the communication channel, and processing passes to step S44b at which an indication is provided to the user B via the user device 2. For example, at step S44b a warning may be displayed or emitted, on the display or from a speaker, of the user device 2.

If, on the other hand, it is determined at step S43b that the identifier calculated at step S42b does match the identifier received in the offer from the user device 1, processing passes to step S45b. At step S45b, it is determined whether the identifier calculated at step S42b matches the identifier within the address from which the call was initially received in the processing of FIG. 4a. If it is determined that the calculated identifier does not match the identifier within the address from which the call was initially received, this may indicate the presence of a third party interception and tampering of the data packets sent via the communication channel, and as such, processing passes to step S46b. At step S46b an indication that the identifier calculated at step S42b does not match the identifier within the address to which the call was received is provided to the user B via the user device 2.

If, on the other hand, it is determined at step S45b that the identifier calculated at step S42b does match the identifier within the address from which the call was initially received, this indicates an absence of third party interception and tampering of data packets sent via the communication channel. As such, processing passes to step S47b. At steps S47a, S47b, the user devices 1, 2 cooperate to establish a session key with which further communications may be encrypted during the communication session. For example, the user devices 1, 2 may utilise the DTLS protocol to establish a suitable session key. After establishing a session key, processing passes to step S48a and S48b on the user devices 1, 2 respectively, and media may be exchanged via the communication channel established during the processing of FIG. 4a.

The processing of FIG. 4a therefore provides a method of establishing a device-to-device communication channel between the user devices 1, 2 which allows for additional, and automated, verification that a third party cannot intercept and decrypt communications sent over the communication channel In particular, the method of FIG. 4a allows a communication channel to be established for which the user devices 1, 2 can verify that encryption details, such as public keys, exchanged between the user devices 1, 2 are indeed the public keys of the user devices 1, 2 and that the public keys have not been replaced by an intermediate third party. The processing of FIG. 4b provides one example method of performing the automated verification. In particular, by confirming that the public key (or an identifier indicating the public key) matches the address to which a "call" was directed, and from which a "call" was received, the need for manual verification of a party's public key is obviated.

It will be appreciated that the embodiments described above with reference to FIGS. 4a, 4b are merely exemplary. In particular, while the present invention is particularly beneficial for applications which utilise the WebRTC definition, the present invention is not so limited. For example, while it is described above that the web applications of the servers 3, 4 provide a script for operation in the browsers of the user devices 1, 2, it will be appreciated that in other embodiments, the browsers may comprise one or more in-built API for communicating with suitable web applications. For example, such APIs may be provided by "plug-ins" stored locally on the user devices 1, 2. Alternatively, web applications provided by the servers 3, 4 may be accessed through dedicated applications locally stored at the user devices 1, 2.

Similarly, while in the context of WebRTC applications it is described above that following authentication processing (e.g. at steps S43a/b to S45a/b) a session key is established, it will be appreciated that this is again merely exemplary. Indeed, a session key need not be established. Alternatively, in other embodiments, public/private cryptographic methods may be used to encrypt further communications over the communication channel.

Further, while it is described above that an SDP handshake is performed to establish shared capabilities of the user devices 1, 2, it will again be appreciated that this is merely exemplary. Other handshake protocols may be used. In alternative example embodiments media processing capabilities of each user device may be predefined, such that it can be known, without a handshake protocol, that the user devices 1, 2 will share a set of media processing capabilities.

It may be desirable to provide additional, manual, authentication. In some embodiments, photographic images of the users A, B may be embedded into their respective public key certificates. In this case, upon receiving a public key certificate from the other party to the call, a photograph of that party may be displayed on the respective displays of the user devices 1, 2. For example, where certificates having the X.509 format are used, a logo field (defined by the "rfc3709.txt" part of the certificate) is provided for the display of company logos. By inserting user photographs into the log field of a public key certificate, an additional layer of authentication may be provided. It will be appreciated that even in the event that the either or both the user A and user B have not previously seen the other, where the communication channel is an audio-visual communication channel, the photographic image received in the certificate may be compared with the video image on-screen.

Alternatively or additionally, an audio signature may be included within a public key certificate, for playback at a receiving user device. For example, an audio signature embedded within a public key certificate may comprise a phrase (for example a set-text) read aloud by the owner of the public key certificate. This may then be compared with the voice that is heard over the communication channel. The inclusion of audio data may be particularly beneficial for visually impaired users.

In a further embodiment, photographic and/or audio data embedded within a public key certificate is automatically compared with corresponding photographic and/or audio data that is received over the communication channel. That is, the user devices 1, 2 may comprise image and/or audio processing applications suitable for comparing the photographic and/or audio data embedded within a received public key certificate with corresponding photographic and/or audio data received over an established communication channel Such image and/or audio processing methods will be readily apparent to the skilled person.

Methods of establishing device to device connections described above may be used to facilitate the secure processing of remotely acquired image data. In this way, image processing and verification may be performed by a trusted device, rather than an application executing on a user device. In one example embodiment, such secure processing may be used to create a trusted association between one user device and another user device.

Referring to FIG. 1, an entry phone 6 of a house 7 of the user B is schematically depicted. The entry phone 6 is also connected to the network 5 and is associated with the user device 1. For example, the entry phone 6 may be provided by an organisation that operates the user device 1, or by an organisation that trusts the user device 1. The entry phone 6 is provided with a pre-assigned public key certificate having a public key $PK_H$. The public key certificate may be stored in a non-volatile memory (not shown) of the entry phone 6. A fingerprint $\#PK_H$ of the public key $PK_H$ is represented by a machine readable optical marker, such as a barcode or a QR code provided with the entry phone 6. For example, the optical marker may be printed, or otherwise affixed, to a casing of the entry phone 6, or to packaging of the entry phone 6.

The entry phone 6 is further provided with (or obtains upon connection with the network 3) a corresponding "identifier" in the federated identity management system utilised by the servers 3, 4. In particular, as described above in connection with the user devices 1, 2, the identifier of the entry phone 6 within the federated identity management system is based upon the fingerprint $\#PK_H$. For example, a suitable identifier for the entry phone 6 may be $\{\#PK_H@server4.com\}$.

Figure 5:
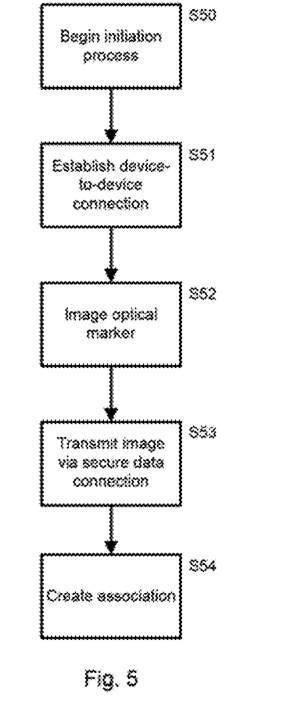
FIG. 5 is a flowchart illustrating processing that may be carried out to separate input acquisition and processing according to an embodiment of the present invention.

FIG. 5 is a flowchart showing processing that may be carried out to associate the user device 2 of the user B with the entry phone 6 to allow calls from the entry phone 6 to be re-directed to the user device 2 (for example if the user B is away from the house 7). At step S50 the user B would use the user device 2 to initiate a device association process. For example, the user B may use the user device 2 to navigate to a web page provided by, or associated with, the user device 1, and to select an appropriate option to begin the initiation process. It will be appreciated that the user B may use a different device (i.e. not the user device 2) to initiate the association process. For the purpose of the presently described example, it is to be understood that the user A, associated with the user device 1, may not be a human user or may not be solely a human user, but may be or include an application operating on the user device 1.

Processing passes to step S51 at which a connection is established between the user device 2 and the user device 1 using the processing of FIGS. 4a, 4b. Upon establishing a device-to-device connection between the user devices 1, 2, at step S52 the user device 2 is directed to image the optical marker provided on or with the entry phone 6 using the camera of the user device 2. It will be appreciated that the user B may be directed by any appropriate means. For example, an audio prompt may be provided over the connection established at step S51.

At step S53, the image of the optical marker is securely transmitted between the user device 2 and the user device 1 over the secure connection established at step S51. Upon receiving the image data from the camera of the user device 2, the user device 1 compares the received image data with the expected image data, and records an association between the user device 2 and the entry phone 6. In this way, the user device 1 need not trust processing performed at the user device 1, but rather can itself securely process the image data received from the user device 2 in real-time.

Following association between the user device 2 and the entry phone 6, calls from the entry phone 6 may be safely routed to the user device 2. In particular, processing such as that described above with reference to FIGS. 4a, 4b may be used to establish a connection between the user device 2 and the entry phone 6. In this way, the user device 2 can validate that incoming calls from the entry phone 6 by comparing the fingerprint on the incoming call with a stored version of the optical code obtained during the association process.

As described above, the above processing may utilise the WebRTC definition. As described above, WebRTC may operate by providing a JavaScript to browsers operating on the user devices. The JavaScript may execute in an isolated security context within each respective browser. In this case, the JavaScript executing within the browser of the user device 2 can cryptographically assert that all image data transmitted over the connection established at step S51 is only from the camera of the user device 2 and has not been post-processed, substituted or mixed before transmission at step S53.

It will be appreciated that the above example embodiment of associated a user device with a network connected object is merely one exemplary application of a separation of input acquisition and subsequent processing such that a device need not rely upon a potentially untrusted device to perform sensitive processing. For example, in addition to optical codes, a user device may obtain computer-readable audio data for processing at a further device. As a further example, sensors of a user device may be used to obtain other signals (for example NFC or RFID signals) during a communication session with a further device established as described above. Those signals may then be transmitted to the further device for processing, without being processed by the user device.

For example, aspects described above maybe used to pair a plurality of network connected (or "smart") appliances with respective corresponding sensors within a building or environment, thereby allowing the appliances and sensors to communicate on a common radio network. Indeed, establishment of device-to-device connections using the methods above have wide ranging applications for allowing secure communication between devices. For example, connections may be established between energy generators (e.g. solar cells, or turbines) may be connected to devices which require charging (e.g. electric vehicles, appliances, etc.) such that once an initial pairing has been established, such devices can communicate securely to allow, for example, the device to request additional energy from the generator as required. By establishing a connection using the methods above, a danger of third parties "siphoning" generated energy, by impersonating a paired device, may be mitigated.

While the above embodiments utilise two intermediate devices (the servers 3, 4) each utilising a federated identity management system, the techniques described herein are not limited to such embodiments. For example, it will be apparent to the skilled person from the teaching above that the techniques described above may be utilised where a single intermediate device (or network) provides what may be referred to as a "delegated" identity management system, to which both users (e.g. the users A/B) connect in order to facilitate the establishment of a connection.

It will be appreciated that aspects of the present invention can be implemented in any convenient way including by way of suitable hardware and/or software. For example, devices arranged to implement embodiments may be created using appropriate hardware components. Alternatively, a programmable device may be programmed to implement embodiments.

The invention therefore also provides suitable computer programs for implementing aspects. Such computer programs can be carried on suitable carrier media including tangible carrier media (e.g. hard disks, CD ROMs and so on) and intangible carrier media such as communications signals.

It will further be appreciated that while example embodiments are described above, modifications may be made to those examples without departing from the scope of the appended claims.

This application claims priority to and the benefit of United Kingdom patent application GB1415675.6, filed Sep. 4, 2014, the contents of which are incorporated in entirety herein by reference.

That claimed is:

1. A method of establishing a communication channel between a first device and a second device via at least one intermediate device, comprising at the first device:
    generating an offer data packet comprising an address of the second device, the address of the second device comprising a first identifier indicating a public key of the second device, the first identifier comprising a hash of the public key of the second device;
    transmitting the offer data packet to a first intermediate device for transmission to the second device based upon the hash of the public key of the second device included in the offer data packet;
    receiving an answer data packet via the first intermediate device, the answer data packet comprising network information associated with the second device;
    establishing a communication channel with the second device based on the network information received in the answer data packet;
    receiving over the communication channel a first handshake data packet comprising a public key;
    calculating a second identifier based upon the public key within the first handshake data packet, the second identifier comprising a hash of the public key within the first handshake data packet;
    comparing the first identifier with the second identifier; and
    providing a warning if a relationship between the first identifier and the second identifier is not an expected relationship.

2. The method of claim 1, wherein the answer data packet comprises a third identifier indicative of a public key and the method further comprises:
    comparing the second identifier with the third identifier; and
    providing a warning if a relationship between the second identifier and the third identifier is not an expected relationship.

3. The method of claim 1, wherein the first intermediate device uses a federated identity management system and the address of the second device is an address within the federated identity management system.

4. The method of claim 1, wherein the offer data packet is created using a WebRTC API.

5. The method of claim 1, further comprising at the second device:
    receiving the offer data packet from a second intermediate device, the offer data packet comprising an address of the first device, the address of the first device comprising a fourth identifier indicating a public key of the first device;
    generating the answer data packet;
    transmitting the answer data packet to the second intermediate device for forwarding to the first device;
    establishing a communication channel with the first device based on network information contained within the offer data packet;
    receiving over the communication channel a second handshake data packet comprising a public key;
    calculating a fifth identifier based upon the public key within the second handshake data packet:
    comparing the fourth identifier with the fifth identifier; and
    providing a warning if a relationship between the fourth identifier and the fifth identifier is not an expected relationship.

6. The method of claim 5, wherein the offer data packet comprises a sixth identifier indicative of a public key and the method further comprises:
    comparing the sixth identifier with the fifth identifier; and
    providing a warning if a relationship between the sixth identifier and the fifth identifier is not an expected relationship.

7. The method of claim 5, wherein the first intermediate device uses a federated identity management system and the address of the second device is an address within the federated identity management system; and
    wherein the second intermediate device uses the federated identity management system and the address of the first device is an address within the federated identity management system.

8. The method of claim 1, wherein the answer data packet is created using a WebRTC API.

9. The method of claim 1, further comprising at the first intermediate device:
    receiving the offer data packet from the first device;
    transmitting the offer data packet to a second intermediate device for onward transmission to the second device;
    receiving the answer data packet from the second intermediate device; and
    transmitting the answer data packet to the first device.

10. The method of claim 9, further comprising at the first intermediate device:
    requesting a session identifier from the first device; and
    receiving a first session identifier from the first device, the first session identifier indicating the public key of the first device.

11. The method of claim 10, further comprising at the first intermediate device:
    detecting the first session identifier in the offer data packet and determining the address of the first device based on the first session identifier;

adding the address of the first device to the offer data packet;

detecting the address of the first device in the answer data packet and determining the first session identifier based on the address of the first device; and adding the first session identifier to the answer data packet.

12. The method of claim 5, further comprising at the second intermediate device:

transmitting the offer data packet to the second device;

receiving the answer data packet from the second device; and transmitting the answer data packet to the first intermediate device.

13. The method of claim 12, further comprising at the second intermediate device:

requesting a session identifier from the second device;

receiving a second session identifier from the second device, the second session identifier indicating the public key of the second device.

14. The method of claim 13, further comprising at the second intermediate device:

detecting the address of the second device in the offer data packet and determining the second session identifier from the address of the second device;

adding the second session identifier to the second data packet;

detecting the second session identifier in the answer data packet and determining the address of the second device based upon the second session identifier; and adding the address of the second device to the answer data packet.

15. The method of claim 14, further comprising exchanging data over the communication channel if the first identifier matches the second identifier.

16. The method of claim 15, further comprising:

receiving a machine-readable input at a sensor of the first device;

transmitting the machine-readable input through the communication channel to the second device; and processing the machine-readable input at the second device.

17. The method of claim 16, wherein the machine readable input is at least one of an optical code, an audio code or a signal.

18. A non-transitory memory medium storing computer readable instructions to establish a communication channel between a first device and a second device via at least one intermediate device, the computer readable instructions, when executed by a processor, causing the processor to perform operations comprising:

generating an offer data packet comprising an address of the second device, the address of the second device comprising a first identifier indicating a public key of the second device, the first identifier comprising a hash of the public key of the second device;

transmitting the offer data packet to a first intermediate device for transmission to the second device based upon the hash of the public key of the second device included in the offer data packet;

receiving an answer data packet via the first intermediate device, the answer data packet comprising network information associated with the second device;

establishing a communication channel with the second device based on the network information received in the answer data packet;

receiving over the communication channel a first handshake data packet comprising a public key;

calculating a second identifier based upon the public key within the first handshake data packet, the second identifier comprising a hash of the public key within the first handshake data packet;

comparing the first identifier with the second identifier; and providing a warning if a relationship between the first identifier and the second identifier is not an expected relationship.

19. A system for establishing a communication channel between a first device and a second device via at least one intermediate device, comprising:

a processor;

a receiver;

a transmitter; and a non-transitory memory storing computer readable instructions that, when executed by the processor, cause the processor to:

generate an offer data packet comprising an address of the second device, the address of the second device comprising a first identifier indicating a public key of the second device, the first identifier comprising a hash of the public key of the second device, cause the transmitter to transmit the offer data packet to a first intermediate device for transmission to the second device based upon the hash of the public key of the second device included in the offer data packet, cause the receiver to receive an answer data packet via the first intermediate device, the answer data packet comprising network information associated with the second device, establish a communication channel with the second device based on the network information received in the answer data packet, cause the receiver to receive over the communication channel a first handshake data packet comprising a public key, calculate a second identifier based upon the public key within the first handshake data packet, the second identifier comprising a hash of the public key within the first handshake data packet, compare the first identifier with the second identifier, and provide a warning if a relationship between the first identifier and the second identifier is not an expected relationship.

* * * * *